(12) United States Patent
Lehnhardt et al.

(10) Patent No.: US 6,817,591 B2
(45) Date of Patent: Nov. 16, 2004

(54) CONCRETE HOSE SHUT-OFF VALVE

(75) Inventors: Gary D. Lehnhardt, Cedar Grove, WI (US); Gordon W. Guslick, Grafton, WI (US)

(73) Assignee: Construction Forms, Inc., Port Washington, WI (US)

( * ) Notice: Subject to any disclaimer, the term of this patent is extended or adjusted under 35 U.S.C. 154(b) by 65 days.

(21) Appl. No.: 10/309,912

(22) Filed: Dec. 4, 2002

(65) Prior Publication Data

US 2003/0127612 A1 Jul. 10, 2003

Related U.S. Application Data

(60) Provisional application No. 60/346,655, filed on Jan. 8, 2002.

(51) Int. Cl.[7] .................................................. F16K 7/07
(52) U.S. Cl. ......................................................... 251/5
(58) Field of Search ...................... 251/5, 291; 137/615; 222/214

(56) References Cited

U.S. PATENT DOCUMENTS

| 2,317,376 | A | * | 4/1943 | Grove et al. ................... 251/5 |
| 2,590,215 | A | * | 3/1952 | Sausa ............................. 251/5 |
| 3,017,903 | A | * | 1/1962 | Walter ............................ 251/5 |
| 3,039,733 | A | * | 6/1962 | Ennio ............................. 251/5 |
| 3,397,860 | A | * | 8/1968 | Bushmeyer ..................... 251/5 |
| 3,791,153 | A | * | 2/1974 | Inoue et al. .................... 251/5 |
| 4,096,211 | A | * | 6/1978 | Rameau ......................... 251/5 |
| 4,199,279 | A | * | 4/1980 | Himeji et al. .................. 251/5 |
| 4,785,841 | A | * | 11/1988 | Breckner ....................... 251/5 |
| 4,824,072 | A | * | 4/1989 | Zakai ............................. 251/5 |
| 5,102,228 | A | * | 4/1992 | Vine-Lott ...................... 251/5 |

FOREIGN PATENT DOCUMENTS

GB  2023210 A  * 12/1979  ............. B28C/7/16

* cited by examiner

*Primary Examiner*—Eric Keasel
(74) *Attorney, Agent, or Firm*—Andrus, Sceales, Starke & Sawall, LLP

(57) ABSTRACT

A shut off valve for use with a concrete delivery hose includes a pair of flexible cylindrical sleeves disposed within a rigid casing that surrounds the hose. A gas chamber is defined between the sleeves so that when pressurized gas is forced into the chamber the inner sleeve will be displaced radially inwardly to constrict the hose and stop the flow of concrete.

6 Claims, 4 Drawing Sheets

CONCRETE HOSE SHUT-OFF VALVE

CROSS REFERENCE TO RELATED APPLICATION

This application is based on provisional U.S. patent application Ser. No. 60/346,655 filed Jan. 8, 2002.

FIELD OF THE INVENTION

The present invention relates to shut-off valves and more particularly to an inline valve to control the flow of concrete in a concrete delivery system.

BACKGROUND OF THE INVENTION

Typically, concrete is delivered at a job site to remote areas via a pump that pumps the concrete through a series of boom connected pipes terminating in a flexible delivery hose. The flow of concrete is typically controlled at a point remote from the delivery hose and thus even when the concrete flow is stopped at its source, it is not unusual for concrete to continue to flow or drip from the end of the delivery hose. This condition can be very undesirable at certain job sites.

It is an object of the present invention to provide a concrete flow valve that is easily installed and operated.

It is a further object of the present invention to provide a valve that is positioned on the outside of the delivery hose so that the valve is not in direct contact with the flow of the concrete.

It is still another object of the present invention to provide a valve that will reduce concrete spill over and/or drippage.

It is also an object of the present invention to provide a gas controlled shut-off valve.

It is an additional object of the present invention to provide various control for the shut-off valve.

BRIEF SUMMARY OF THE INVENTION

In accordance with one aspect of the invention, a shut-off valve for use with a concrete delivery hose includes an outer rigid casing disposed around the concrete delivery hose. The present invention further includes a first flexible sleeve disposed within the casing. The device is provided with a second flexible cylindrical sleeve disposed within the first flexible sleeve so as to define a gas chamber between the first and second sleeves. The device is provided with a gas port that extends through the casing and into the gas chamber so that pressurized gas can be introduced into the chamber causing the second sleeve to be forced radially inwardly to constrict and close the delivery hose.

In accordance with another aspect of the invention, a method of controlling the flow of concrete through a concrete delivery hose includes the steps of providing a gas-actuated valve positioned on an outside surface of the concrete delivery hose; and controlling the amount of gas delivered to the valve so that the valve will expand radially inwardly to constrict the flow of concrete through the hose so that delivery of concrete is interrupted, or will expand radially outwardly to allow the flow of concrete through the hose.

The invention also contemplates a shut-off valve for use with a concrete delivery hose wherein the invention is improved by mounting the shut-off valve on an outside surface of the concrete delivery hose such that the valve is not in direct contact with the flow of concrete.

Various other features, objects, and advantages of the invention will be made apparent from the following detailed description and the drawings.

BRIEF DESCRIPTION OF THE DRAWINGS

The drawings illustrate the best mode currently contemplated of carrying out the invention.

In the drawings.

DETAILED DESCRIPTION OF THE INVENTION

Figure 1:
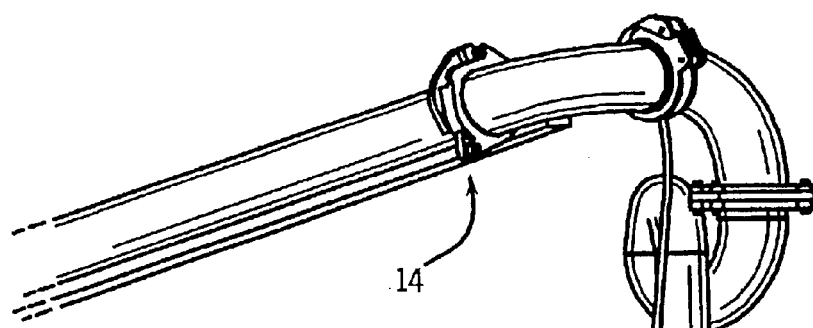
FIG. 1 is a perspective view of a shut-off valve constructed according to the present invention connected to the delivery hose of a concrete pumping system.
Figure 1:
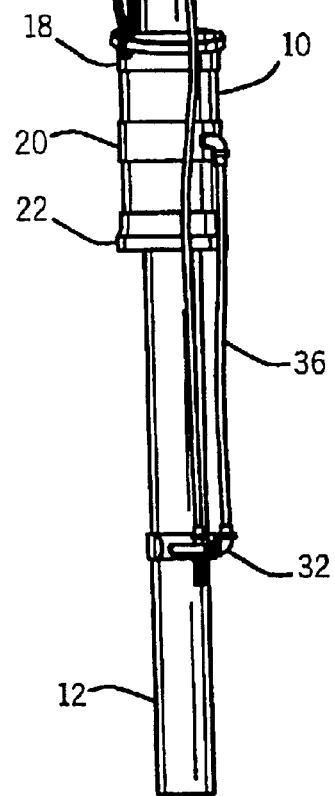
Figure 2:
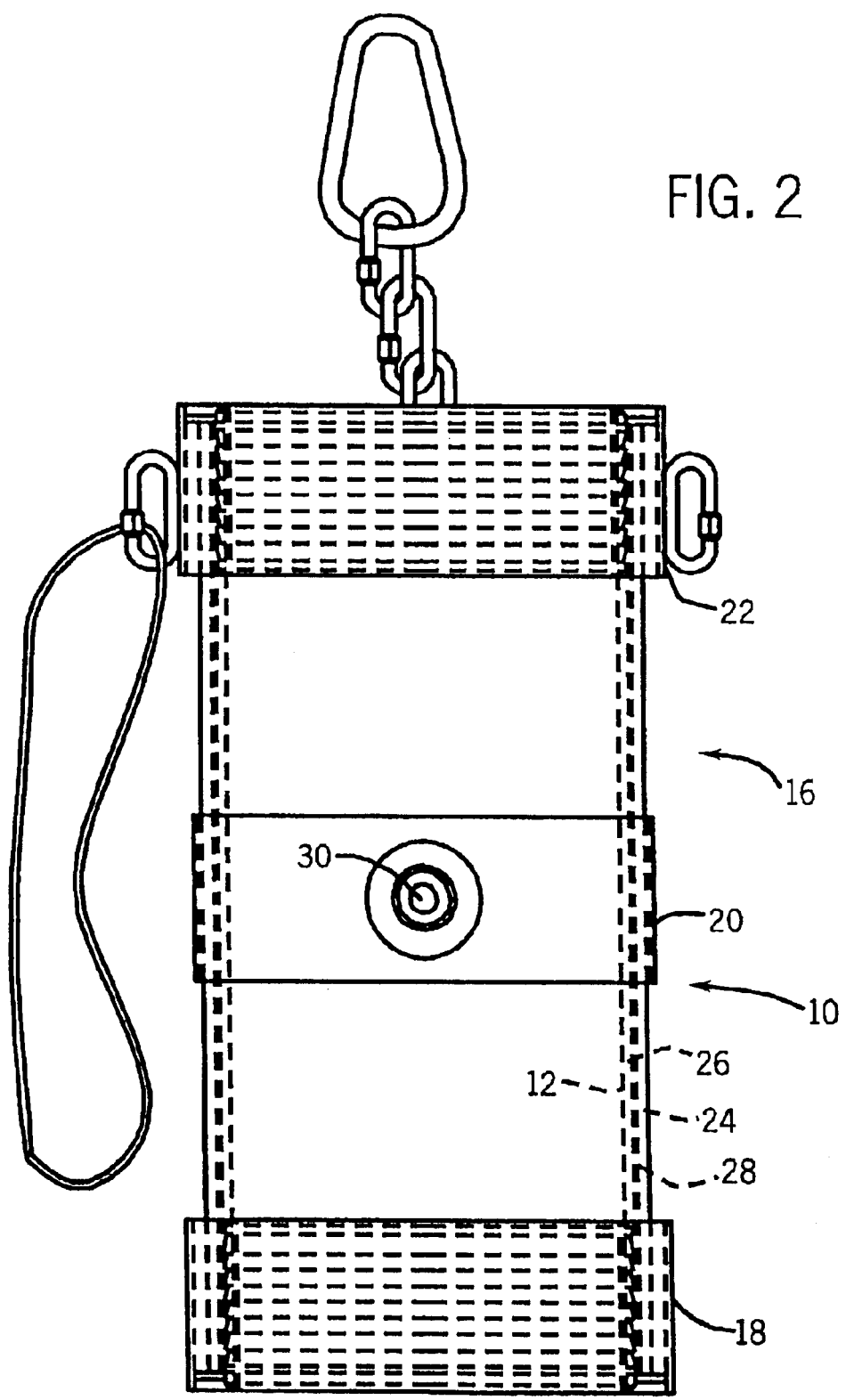
FIG. 2 is a side cross-sectional view of the valve of FIG. 1.
Figure 3:
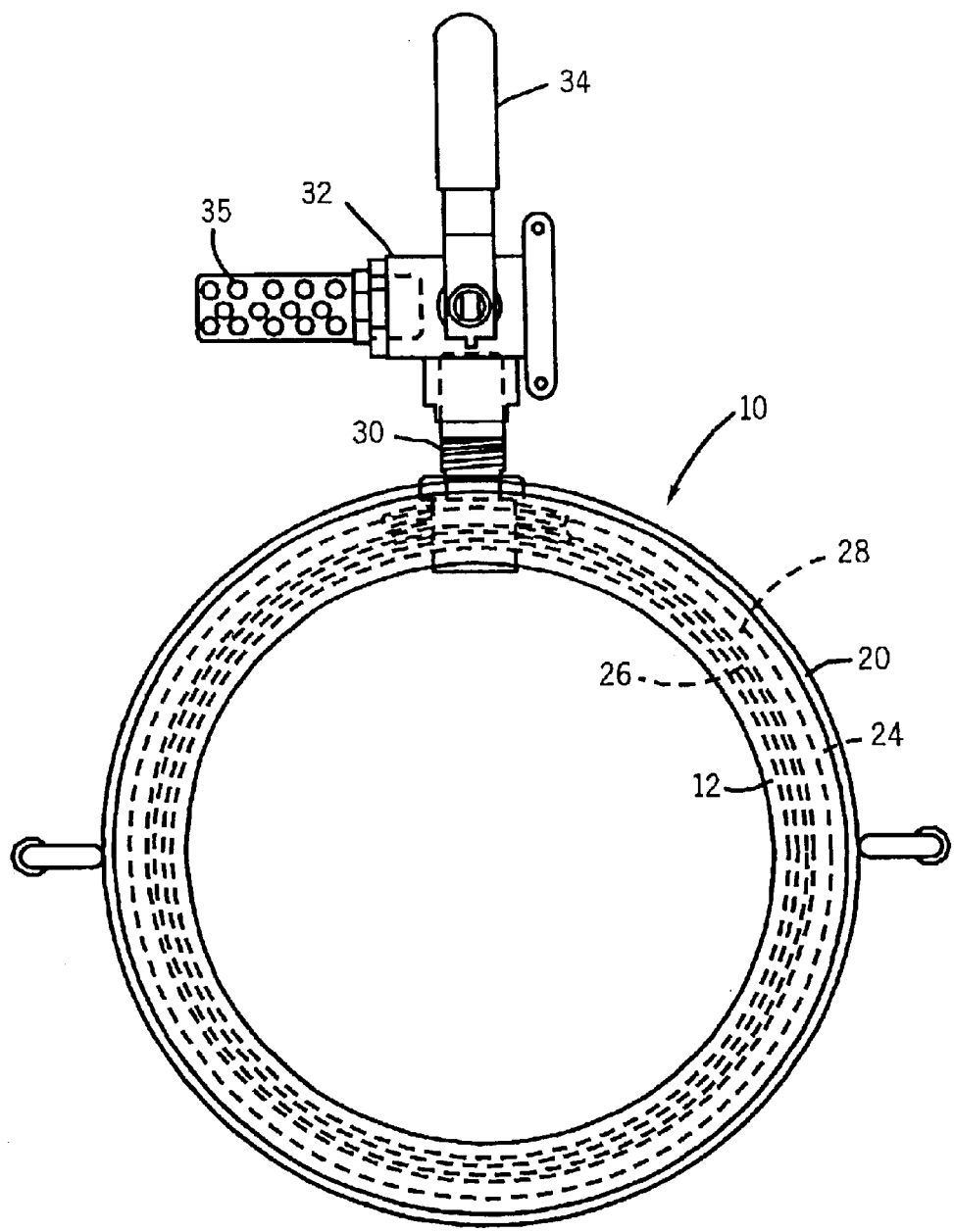
FIG. 3 is an end cross-sectional view of the valve of FIG. 2.

As seen in FIG. 1, a concrete control valve 10 is connected to and surrounds the concrete delivery hose 12 of a concrete pumping system 14. Control valve 10 includes an outer rigid casing 16 in the form of three steel bands 18, 20 and 22.

A first flexible rubber sleeve 24 is disposed in and connected to rigid sleeve 16. A second flexible rubber sleeve 26 is disposed radially inwardly of first sleeve 24 and defines a gas chamber 28 between first sleeve 24 and second sleeve 26.

A gas port 30 is disposed on middle band 20 and extends through band 20 and first sleeve 24 so that it communicates with gas chamber 28. A gas flow control valve 32 with a manual control handle 34 and a muffler 35 is disposed on the outside of gas port 30. Gas line 36 channels a source of gas to control valve 32. Gas flow control valve 32 is retained in place around hose 12 by a strap 38. Gas flow control valve 32 is located beneath the concrete control valve 10.

In operation, pressurized gas such as air, nitrogen or the like is introduced into chamber 28 via flow valve 32 and gas port 30. First sleeve 24 is held in place by rigid casing 16 while second sleeve 26 expands radially inwardly to constrict delivery hose 12 to the point where the flow of concrete through delivery hose 12 is interrupted. When it is desired to resume the flow of concrete, the gas pressure is relieved so that second sleeve 26 can expand to its original position and delivery hose 12 will reopen.

Figure 4:
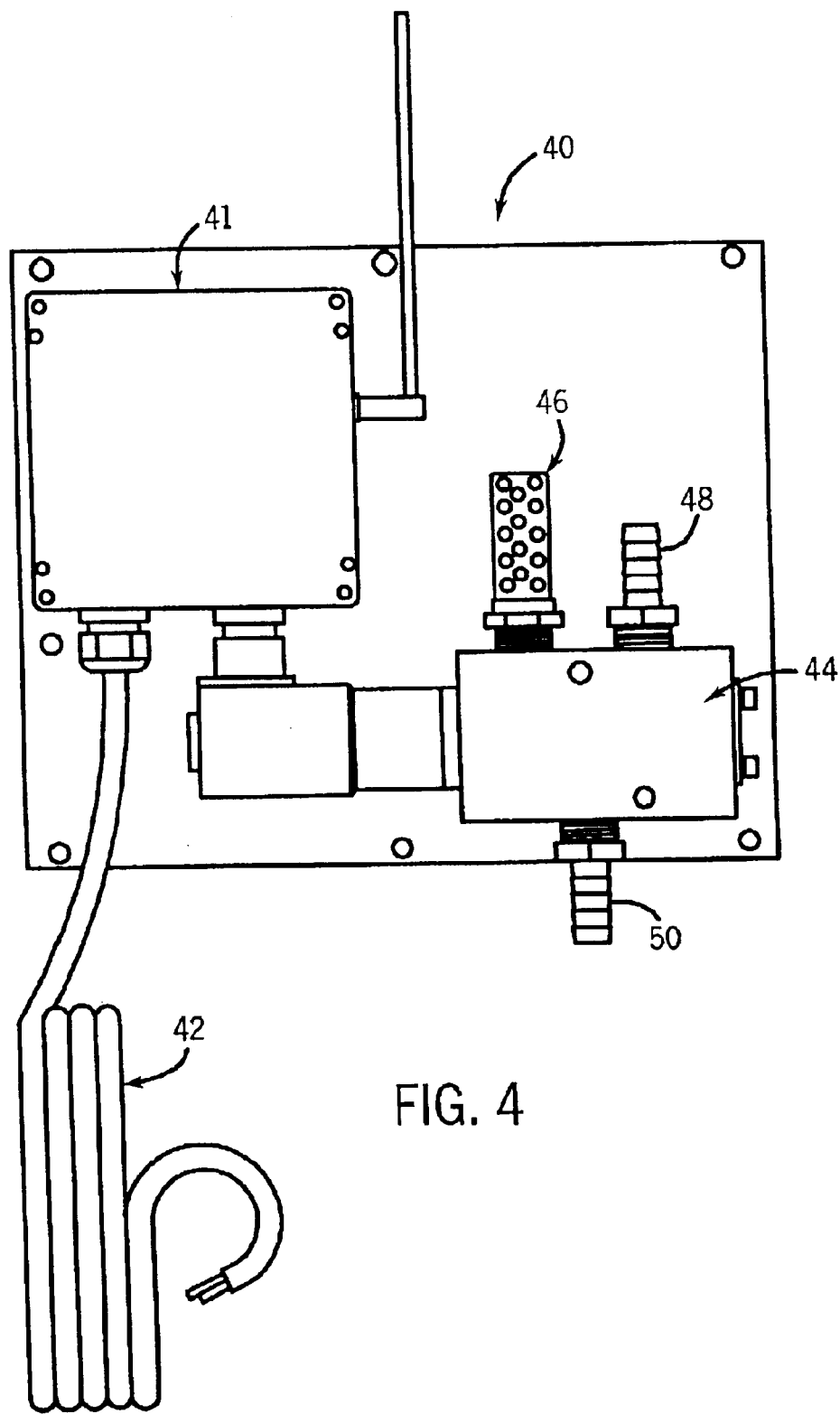
FIG. 4 is a representation of remote control for the valve of FIG. 1.

It should be understood that control valve 12 can either be hand operated with control handle 34 or interlocked with the control system of the pumping truck or controlled remotely as shown in FIG. 4. The remote control 40 includes a remote control box 41 connected to a cord 42 and joined to an air solenoid valve 44 having a muffler 46, a gas inlet 48 and a gas outlet 50. A separate remote control unit (not shown) triggers the solenoid valve 44.

It is recognized that other equivalents, alternatives, and modifications aside from those expressly stated, are possible and within the scope of the appended claims.

What is claimed is:

1. A shut-off valve for use with a concrete delivery hose whereby the flow of concrete through the hose can be controlled, the valve comprising:

an outer substantially rigid casing dimensioned to be disposed around the concrete delivery hose;

a first flexible cylindrical sleeve disposed within the casing;

a second flexible cylindrical sleeve disposed within the first flexible sleeve and defining a gas chamber between the first and second sleeves; and a gas port extending through the casing and into the gas chamber whereby pressurized gas can be introduced into the chamber causing the second sleeve to be forced radially inwardly to constrict and close the delivery hose.

2. The shut-off valve of claim 1, wherein the casing is comprised of a series of three bands circumferentially surrounding the concrete delivery hose.

3. The shut-off valve of claim 2, wherein a middle one of the bands includes the gas port.

4. The shut-off valve of claim 1, wherein a manually actuated, gas flow control valve is attached to the concrete delivery hose below the casing.

5. The shut-off valve of claim 1, wherein the first and second sleeves are comprised of rubber.

6. The shut-off valve of claim 1, wherein delivery of gas to the gas port is governed by a remote control.

* * * * *